(12) United States Patent  (10) Patent No.: US 8,923,324 B2
Guthrie  (45) Date of Patent: Dec. 30, 2014

(54) METHOD FOR OPERATING A WIRELESS NETWORK

(75) Inventor: Brian J. Guthrie, Aberdeen (GB)

(73) Assignee: Koninklijke Philips N.V., Eindhoven (NL)

( * ) Notice: Subject to any disclaimer, the term of this patent is extended or adjusted under 35 U.S.C. 154(b) by 1527 days.

(21) Appl. No.: 10/569,122

(22) PCT Filed: Aug. 20, 2004

(86) PCT No.: PCT/IB2004/002742
 § 371 (c)(1),
 (2), (4) Date: Feb. 23, 2006

(87) PCT Pub. No.: WO2005/022846
 PCT Pub. Date: Mar. 10, 2005

(65) Prior Publication Data
 US 2007/0019672 A1   Jan. 25, 2007

(30) Foreign Application Priority Data

Aug. 30, 2003   (GB) .................................. 0320432.8

(51) Int. Cl.
 *H04J 3/16*  (2006.01)
 *H04W 88/06*  (2009.01)
 *H04W 84/18*  (2009.01)
 *H04W 24/00*  (2009.01)
(52) U.S. Cl.
 CPC .............. *H04W 88/06* (2013.01); *H04W 84/18* (2013.01); *H04W 24/00* (2013.01)
 USPC ............................ 370/466; 370/329; 370/338

(58) Field of Classification Search
 USPC ............ 455/552.1; 370/395.5, 401, 337, 347, 370/310, 329, 349; 709/208
 See application file for complete search history.

(56) References Cited

U.S. PATENT DOCUMENTS

| | | | | |
|---|---|---|---|---|
| 6,480,476 | B1* | 11/2002 | Willars | 370/311 |
| 6,643,522 | B1* | 11/2003 | Young | 455/552.1 |
| 6,754,250 | B2* | 6/2004 | Haartsen | 375/132 |
| 6,775,258 | B1* | 8/2004 | van Valkenburg et al. | 370/338 |
| 6,895,255 | B1* | 5/2005 | Bridgelall | 455/552.1 |
| 6,954,616 | B2* | 10/2005 | Liang et al. | 455/63.1 |
| 6,957,086 | B2* | 10/2005 | Bahl et al. | 455/557 |
| 6,965,590 | B1* | 11/2005 | Schmidl et al. | 370/343 |
| 6,975,613 | B1* | 12/2005 | Johansson | 370/338 |
| 7,161,923 | B2* | 1/2007 | Young | 370/338 |
| 7,180,876 | B1* | 2/2007 | Henry et al. | 370/329 |
| 7,193,965 | B1* | 3/2007 | Nevo et al. | 370/230 |

(Continued)

OTHER PUBLICATIONS

Specification of the Bluetooth System, V1.0 B, published Dec. 1, 1999. See whole document.*

(Continued)

*Primary Examiner* — Michael J Moore, Jr.
(74) *Attorney, Agent, or Firm* — Larry Liberchuk

(57) ABSTRACT

A radio system employing at least one dual protocol equipped radio device is described. The system and devices form a piconet in which message transaction parameters such as amount of data or requests to join the piconet, are monitored (60). A dual protocol device is then selected (62) (or selects itself) according to the monitored parameters, and the selected device then switches (64) the protocol it is using from a first protocol (such as Bluetooth), to a second protocol (such as ZigBee). Hence a flexible piconet is achieved in which various requirements concerning data connection and data-rates are accommodated.

14 Claims, 4 Drawing Sheets

(56) References Cited

U.S. PATENT DOCUMENTS

| | | | |
|---|---|---|---|
| 7,233,602 B2* | 6/2007 | Chen et al. | 370/445 |
| 7,272,132 B2* | 9/2007 | Kim et al. | 370/350 |
| 7,519,393 B2* | 4/2009 | Bahl et al. | 455/557 |
| 7,616,621 B2* | 11/2009 | Morris | 370/346 |
| 8,364,080 B2* | 1/2013 | Desai et al. | 455/41.2 |
| 2002/0059434 A1* | 5/2002 | Karaoguz et al. | 709/228 |
| 2002/0075941 A1* | 6/2002 | Souissi et al. | 375/133 |
| 2002/0136184 A1 | 9/2002 | Liang et al. | |
| 2002/0176388 A1 | 11/2002 | Rankin et al. | |
| 2003/0053437 A1 | 3/2003 | Bahl et al. | |
| 2003/0142631 A1 | 7/2003 | Silvester | |
| 2004/0151136 A1* | 8/2004 | Gage | 370/328 |
| 2004/0204071 A1* | 10/2004 | Bahl et al. | 455/557 |
| 2005/0025182 A1* | 2/2005 | Nazari | 370/469 |
| 2005/0170776 A1* | 8/2005 | Siorpaes | 455/41.2 |
| 2005/0181725 A1* | 8/2005 | Dabak et al. | 455/41.2 |
| 2006/0183423 A1* | 8/2006 | Johansson et al. | 455/41.2 |
| 2006/0203796 A1* | 9/2006 | Morris | 370/346 |

OTHER PUBLICATIONS

Bluetooth Specification Version 1.1, published Feb. 22, 2001. See whole document.*
NPL Document: IEEE 802.11—1999 published 1999 by IEEE computer Society.*
NPL Document: Wireless Zero Configuration published Nov. 2002, by Microsoft TechNet.*
Jesus A. G. Pulido; "Hand Free Profile", Jul. 15, 2002, CAR_X_SPEC/1.0C.
Philips: The Zigbee Alliance.
Philips: Zigbee, Venkat Bahl, Semiconductors Division.
"Wireless Parasitic Modem, Wireless Parasitic Data Radio, Data Radios".
Venkat Bahl; The Zigbee Alliance, Sep. 2002.
Philips: Zigbee vs Bluetooth.
ISR: PCT/IB04/002742.
Written Opinion: PCT/IB04/002742.

* cited by examiner

METHOD FOR OPERATING A WIRELESS NETWORK

The present invention relates to a method for operating a wireless network in which at least some of the devices in said network have multiple radio protocol capability. The present invention has particular, but not exclusive, application to personal area wireless networks or piconets having various data-rate and message requirements depending upon application.

Modern digital wireless networks by which devices may communicate offer many advantages to a user, particularly in the area of personal area networks in which a user may employ various devices in an ad-hoc fashion about his or her body. Such networks tend to employ a single radio protocol, designed for particular application spaces/scenarios. Examples of such protocols include Bluetooth™ for limited peer-to-peer or master/slave voice/data personal area networks, and ZigBee™ for low power low data rate networks. The increasingly commonplace IEEE802.11 protocol is another example, the protocol coming in several "flavours" (a,b,g) and envisaged as a general local area network (LAN) replacement.

The Bluetooth protocol version 1.1 (available from the Bluetooth Special Interest Group BT-SiG), at the time of writing, limits a master/slave piconet to seven active slave devices for every master device. In addition, the specification allows slave devices to enter a "park" mode in which the device, although still a member of the piconet, does not participate (i.e. transmit) on the channel. It is, however still required to receive synchronisation or "beacon" signals from the piconet master, in order to stay frequency hop synchronised. In the parked mode, the baseband of a slave device is essentially asleep, in a power conservation mode.

A Bluetooth master device cannot order a device to enter the park mode, only request it to do so. If the request is denied, the master device can force the slave device to disconnect from the network.

Hence, if a device requests to join such a Bluetooth piconet, then some of the existing devices will have to cease participating in the piconet and enter a park mode to enable the device wishing to join the network. Alternatively, the device requesting may set up it's own piconet with itself as a master and an existing slave device of the former piconet may then join the latter piconet, thereby forming a "scatternet".

Neither of these solutions are ideal, in the former case at least one of the existing devices will have to enter a park mode. This may be undesirable if that device has data which it must continuously, or frequently, supply to the master device, which itself may be required to act on that data immediately. In the latter "scatternet" case, the device wishing to join which sets itself up as a master cannot conserve power (only slaves may enter a park mode) and furthermore the slave bridging the two piconets has limited access to the piconet it is not currently engaged with.

Additionally, there exist application scenarios, for example in the medical field, where a wide range of sensing devices may be employed, some of which may require low data rates with infrequent update periods, and some of which may require larger data rates (for vocal reporting/recording of data to/for a remote doctor for example) with an almost continuous update period.

There is therefore a need for a single network in which the above disadvantages of a current Bluetooth piconet are reduced.

According to a first aspect of the present invention there is provided a method for operating a wireless piconet in which devices are operable to communicate by exchanging messages according to a first and a second radio protocol, the method comprising monitoring parameters related to message transactions according to said first protocol, selecting a device in dependence on said monitored parameters, and switching the protocol used for communication by the selected device from said first protocol to said second protocol.

According to a second aspect of the present invention there is provided a radio system in which devices are operable to communicate in a piconet by exchanging messages according to a first and a second radio protocol, the system comprising means for monitoring parameters related to message transactions according to said first protocol, means for selecting a device in dependence on said monitored parameters, and means for switching the protocol used for communication by the selected device from said first protocol to said second protocol.

According to a third aspect of the present invention there is also provided a device for use in a radio system in which devices are operable to communicate in a piconet by exchanging messages according to a first and a second radio protocol, the device comprising processing means for executing communication instructions according to a first or a second radio protocol, a first and second baseband circuit and at least one radio for encoding and modulating the transmission and reception of messages in accordance with either of said first or second protocols, the device further comprising processing means operable to monitor parameters related to message transactions according to said first protocol, select a device in dependence on said monitored parameters, and to switch the protocol used for communication by said selected device from said first protocol to said second protocol.

Owing to the invention, a device participating in a radio system/piconet has at least dual protocol compatibility. Preferably, application and monitoring code provided in memory of the device enable it to monitor parameters associated with message transactions, select a device (including itself) in dependence on the outcome of the monitoring and alter the protocol the selected device is employing.

In one embodiment, in a primarily Bluetooth master/slave piconet having seven slave device members, the monitored parameters may comprise receiving, from a further device, a request to join the network, and wherein the protocol used by the selected device is altered to accommodate said further device. Hence, in this embodiment, preferably the master device receives the request, and requests an existing member device of it's piconet which has dual protocol capability to switch to the second protocol. Preferably the second protocol is that as currently being standardised by the ZigBee Alliance. Hence, one of the slave devices switches from Bluetooth to ZigBee, and the requesting device is then informed it may join the piconet.

In other embodiments, the monitored parameters may comprise the amount of data transmitted by each device in a specified time period to affect said selection. Hence, a device using Bluetooth may after a while switch itself over to ZigBee if it is only sending small amounts (a few bytes or kb/s) of data and does not require the larger bandwidth as provided in Bluetooth. This enables power saving as in general ZigBee is designed to provide long battery life (weeks/months) for portable or sensor devices having low data rates.

Advantageously, the device application or protocol stacks contain device profiles which for a dual protocol device define a default or preferred protocol and device capabilities, and whether such devices are able to operate in either mode. Hence a mixed Bluetooth/ZigBee piconet may be created, in which the devices co-exist, and those which can switch over to ZigBee may be selected to do so when monitored data-rates exceed certain predefined thresholds, or when other devices require registering on the piconet, or if a noisy radio environment is encountered, the more robust error-correcting protocol is selected for use.

Other features are disclosed in the attached claims to which the reader is now directed.

Embodiments of the present invention will now be described, by way of example only, and with reference to the accompanying drawings wherein.

Figure 1:
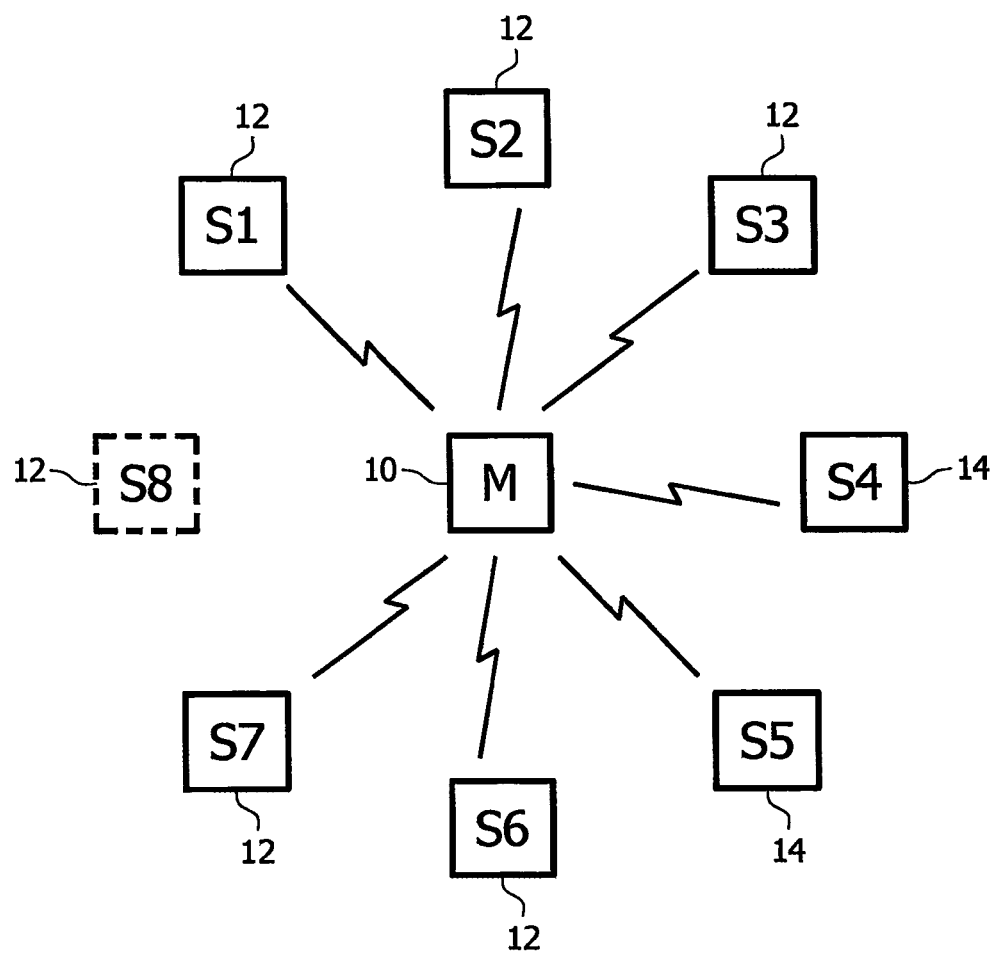
FIG. 1 is a pictorial representation of a piconet.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

FIG. 1 is a pictorial representation of a radio system comprising a master device 10 (M) and slave devices 12 (S1,S2,S3,S6,S7), and further slave devices 14 (S4,S5). The devices 12 are single protocol in that they are equipped with a single or first radio protocol stack, and hence they participate in the piconet using only this communications protocol. Device S8 is a device wishing to join the piconet, as will be discussed later.

The master device 10 and further slave devices 14 (S4,S5) are capable of communicating using either a first or a second radio protocol, and they are also capable of monitoring various parameters related to radio message transactions within the piconet, of selecting a device in the piconet and of switching protocols (either their own, or requesting another device to switch if so selected) based on the monitored parameters.

An example application scenario for the system/piconet of FIG. 1 may be a mobile health monitoring system employed for example by a paramedic or emergency rescue team attending an emergency. In this scenario, the master (M) 10 is embodied in a portable computer (laptop or PDA) and coordinates communication between the slave devices (S1-S7). The slaves may be embodied in a mobile telephone giving the master device internet/hospital network access, a wireless headset relaying voice instructions from a remote doctor who is receiving sensor data from the wireless slave devices embodied as various health monitoring sensors (e.g. temperature, ECG, oxygen levels, pulse monitors).

In such an application scenario, various types of data (voice, sensed readings) need to be supported, together with various data-rates (large, asynchronous streaming for voice/ECG, small infrequent data rates perhaps for temperature, pulse).

Hence, a digital radio standard with features suitable for voice may not entirely be suitable for applications requiring infrequent or low data-rate connections, particularly in application scenarios such as that described above where many battery powered sensors may be required to be applied, and a short range (1-10 m) piconet established that may be required to operate for unspecified periods of time. Radio devices 10, 14 operable to communicate according to more than one radio protocol, the protocol in use by such devices being determined by the monitoring of radio message transactions and perhaps other quality of service parameters (bandwidth, error rates for example), would be desirable for such demanding application scenarios.

Figure 2:
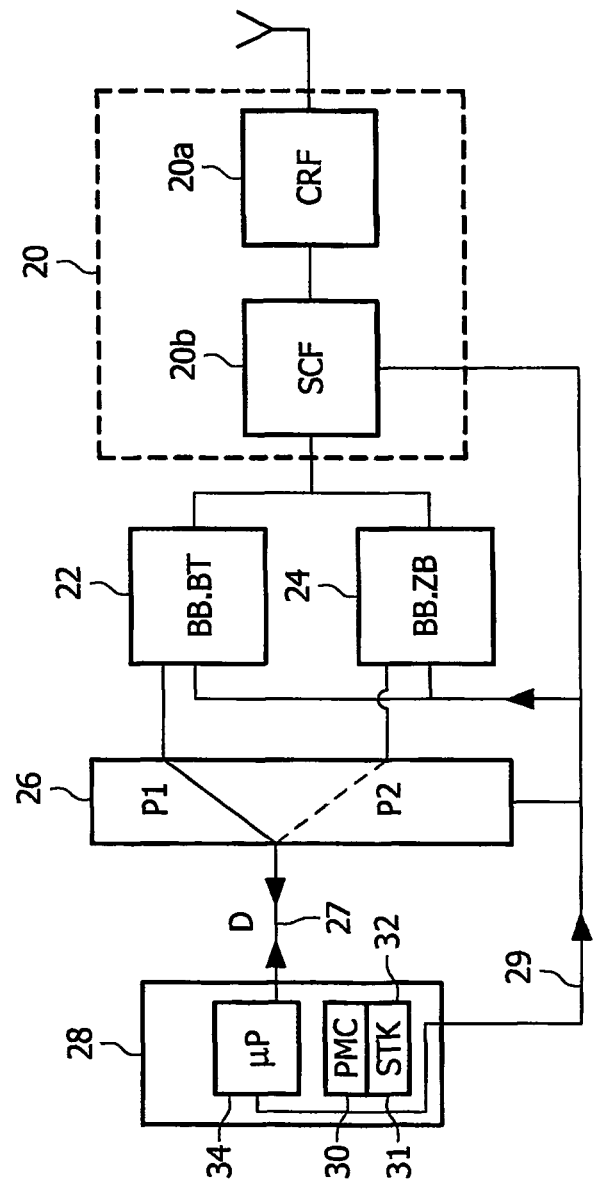
FIG. 2 is a block diagram of a dual protocol device.

FIG. 2 is a block diagram of such a dual protocol device suitable to embody the present invention, and employed in the piconet of FIG. 1 in master device 10 and further slave devices 14 (S4,S5). The device comprises a radio part 20 having a common radio frequency front end 20a (CRF, operating in the ISM band at 2.4 GHz) and a switchable channel filter 20b (SCF). The radio part 20 is connected to a first baseband circuit 22 (BB.BT) and a second baseband circuit 24 (BB.ZB). The baseband in use is selected by transistor switching circuit 26 which in position P1 selects baseband 22 and in position P2 selects baseband 24. Processing module 28 comprises memory 32 storing protocol monitoring software code (PMC) 30. The module 28 is provided with a microprocessor 34 either on board (as shown in the Figure) or with a link to a host microprocessor of the portable device/sensor in which the radio device is installed.

The module 28 also stores the software defined layers of a first and second radio protocol stack 31 (STK). Digital radio protocols are often described as stacks of functional layers, some of which are realised in silicon/circuit layouts (the basebands effectively function as a physical (PHY) and part of a medium access control (MAC) layer), and some of which (the upper layers) are embodied as software code. The switching circuit 26 is connected to basebands 22, 24 and selects a baseband for operation in response to signals output by module 28 on data lines 27 and control lines 29.

In this embodiment, the well known Bluetooth™ radio protocol v1.1 is provided in module 28, together with baseband 22, and the radio protocol known as ZigBee™ is provided by baseband 24 and module 28.

Figure 3:
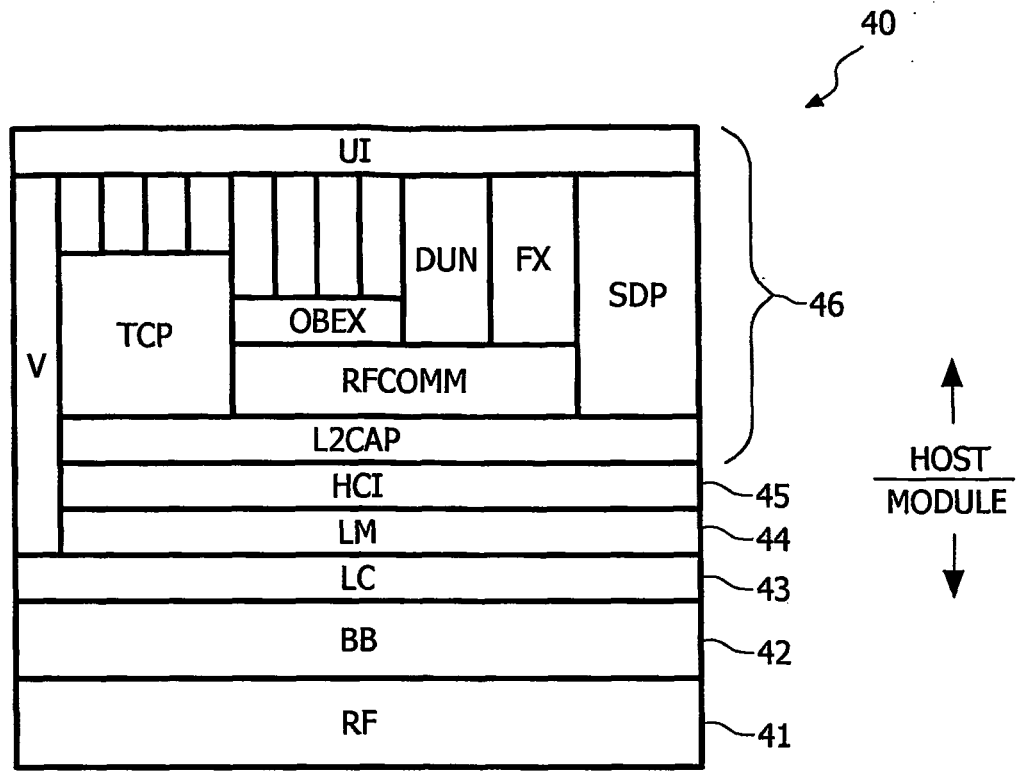
FIG. 3 is a diagram of a first protocol stack.
Figure 4:
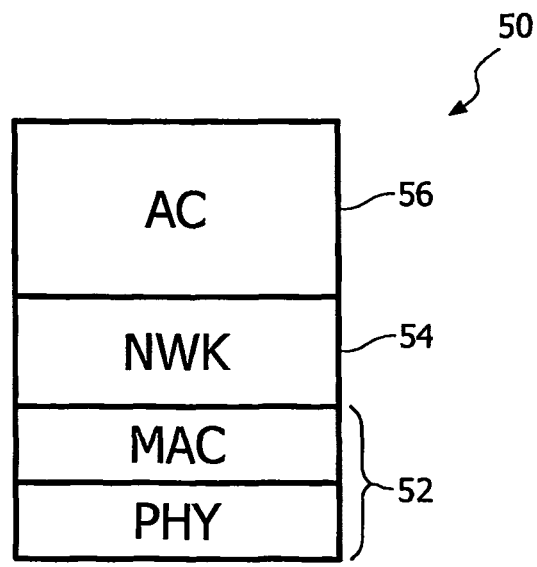
FIG. 4 is a diagram of a second protocol stack.

FIG. 3 and FIG. 4 illustrate the radio protocol stacks according to Bluetooth and ZigBee respectively.

FIG. 3 shows the Bluetooth stack 40. The stack comprises the silicon embodied layers RF (radio frequency) 41, a baseband (BB) 42 layer followed by a link control (LC) 43 and link manager (LM) 44 layer, and a host control interface (HCI) 45. This portion of the protocol is usually provided as a module, for example the Philips™ TrueBlue module BGB201.

The device (host) in which the module is integrated (e.g. mobile phone, laptop, ECG monitor/sensor) is then provided with the upper application specific layers 46 (telephone control protocol TCP, RFCOMM-serial port, Fax Fx, voice V, user interface UI and so on). Hence in FIG. 2, the processing module 28 further represents the host device having memory for storing the host layers and other application code.

FIG. 4 illustrates the second radio protocol stack provided in the device of FIG. 2 as previously described. In the embodiment, the low power, low data rate, direct spread spectrum sequencing standard known as ZigBee™ (www.zigbee.com) is illustrated. ZigBee is intended for monitoring and sensing applications and thus has a much simpler protocol stack than that of Bluetooth, as is evident from the Figure. The stack 50 comprises the lower radio layers 52 (physical (PHY) and medium access control (MAC)), an upper networking layer (NWK) 54 and an application code (AC) containing layer 56.

Hence the software and hardware (baseband 22,24,radio 20) provision of the stacks 40, 50 provides the device 10 (M), and further devices 14 (S4,S5) with a dual radio protocol capability. Also provided in each device 10,14 is a software module (PMC) 30 for monitoring, selecting and switching the protocol used by said device 10,14. This code 30, essentially monitors via data feeds 27 and controls via control line 29 the protocol used by the device. The operation of the piconet of FIG. 1 will now be described with reference to FIG. 5.

EXAMPLE 1

Device S8 Wishes to Join the Piconet of FIG. 1

Figure 5:
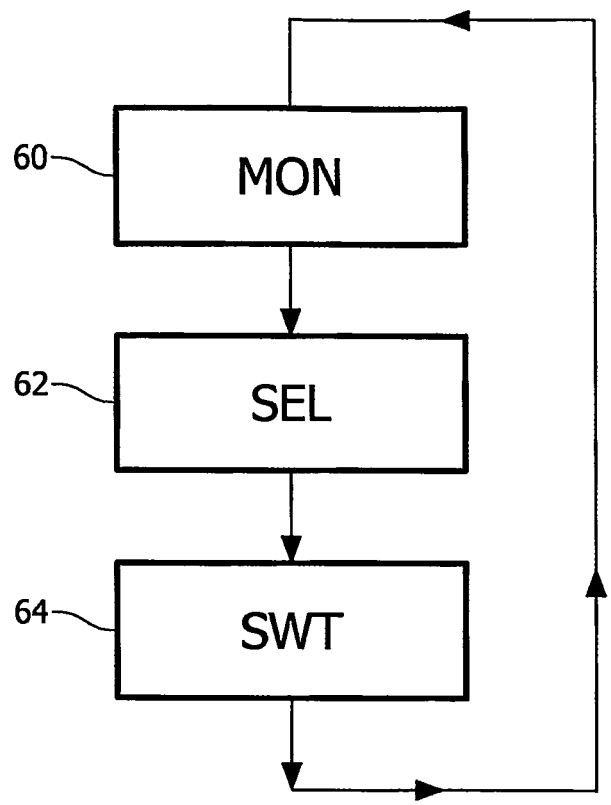
FIG. 5 is a flow chart illustrating the steps of a method of operating the piconet.

The piconet comprising the device (M) and devices S1 to S7 is established as a Bluetooth piconet, operating at 2.4 GHz using a frequency hopping scheme (implemented by baseband 22) as is well known to those skilled in the art of Bluetooth piconets. Suppose now a further device S8 issues a request to join the piconet of master or link controlling device 10. The stack 40 of master device 10 processes the incoming radio message containing the request, stripping away layer specific data until payload data representing the request is passed to network layer code and software module 30 (PMC) in the master device 10. The PMC code 30 actions are illustrated in FIG. 5.

The device 10, under control of PMC code 30, monitors (MON—step 60) the received data in the payload portion of the digital radio message, and determines that the data is a request to join, and that the Bluetooth piconet is full with seven active Bluetooth devices (S1-S7). The device 10 then, at step 62 (SEL), selects a device for protocol changing. The master, consulting its piconet information (stored as configuration data comprising piconet device identifiers in memory 32) determines that device S4 is a dual protocol device and issues a message to S4 asking it to switch its protocol from Bluetooth to ZigBee.

The processor 34 of device S4 receives the request, issues an acknowledgement message, leaves the Bluetooth piconet, and the protocol it is using is then switched at step 64 (SWT). This is achieved by the processor 34, acting under instructions from PMC code 32, causing the switching transistor circuit 26 to switch from functional position P1 to P2 to select baseband 24 (BB.ZB) for use. The master device 10, then issues a registration acknowledgement message to the requesting device S8, and registration occurs as described in the Bluetooth v1.1 specification at chapter 10.

The master device subsequently services device S4 as a ZigBee device using baseband 24 and stack 50. Messages formulated using the ZigBee protocol are transmitted using a direct sequence spread spectrum (implemented by baseband circuitry 24) technique at 2.4 GHz. Therefore, there may be some interference with the frequency hopping scheme used by Bluetooth at 2.4 GHz to encode Bluetooth messages.

However, Zigbee device radios tend to be active on a channel for short periods of time over which small amounts of data are transmitted (the shortest message length in ZigBee comprises only 11 bytes of data). Hence, the probability of a Bluetooth/ZigBee transmission packet collision is reduced. Furthermore, the ZigBee protocol uses a carrier sense multiple access scheme by which a ZigBee radio may, upon sensing interference or noise on the channel, delay transmission until the channel is clear. Hence, a device acting as a ZigBee slave is enabled to delay transmission of a message whilst a Bluetooth device is transmitting, further reducing possible interference.

The piconet of FIG. 1 now contains a master device (M) 10, seven Bluetooth slave devices (S1-S7) and the device S4 communicating with the master device 10 according to the ZigBee protocol at 2.4 GHz.

EXAMPLE 2

Slave S4 Monitors, and Initiates Self Switching of Protocol

In this example, the piconet M, S1-S7 is initiated as a Bluetooth piconet. The slave device S4 and S5, which are dual protocol enabled as described previously, then themselves monitor the amount of data they are transmitting. For example, the PMC code of device S4, incorporated in a pulse sensor, quickly determines that it is only sending a few tens of bytes every second.

For example, the pulse transducer MLT1010 (incorporated in a finger sensor by AdInstruments™) uses a sample rate in the range 40-400 samples/s. The PMC code, at monitoring step 60, compares this with a threshold of say 1000 samples/s provided in the code, determines that the amount of data sent is less than the threshold, and at step 62 then selects itself for protocol alteration. As before, it sends a deregistration message (in Bluetooth a "DETACH" command) to the master device 10, switches via transistor circuit 26 to the ZigBee baseband 24 and protocol 50, and then carries on sensing the pulse and sending pulse data to the master 10 according to the ZigBee protocol.

Preferably, the master 10 operates the ZigBee mode of reference signal periodic beaconing, in-between which beacons, a slave device "sleeps" thereby conserving power. In such a "sleep" state, a timer incorporated in the slave's microcontroller counts down to the next appropriate time to wake up (i.e. when a beacon signal from the master is imminent).

Optionally, the master device 10 may monitor quality of service parameters such as the number of bit errors and retransmissions required between itself and say the slave device S4. If the number of errors are great, then the master may request the device S4 to switch protocol back from ZigBee to Bluetooth. This is advantageous in that Bluetooth uses a forward error correction scheme, which should result in less message re-transmission requests than the simple error detection and retransmission scheme used by ZigBee.

Additionally, when first registering with the master device, a device (S1-S8) may supply its own predefined device requirements from a stored device profile. For example the Bluetooth hands-free profile specification defines the minimum set of functions such that a mobile phone can be used in conjunction with a hands-free device with a Bluetooth link providing the voice/data connection between the two.

In yet a further embodiment, where the monitoring reveals two devices (for example S4 and S5) as candidates for protocol switching, the master may make a decision as to which device to request to switch based on the amount of data (or bandwidth) used by each device, comparing the device requirements in said stored device profiles and selecting the appropriate device. For example, a device (S5) using a voice channel although capable of switching, may not be requested to switch when compared with another device (S4) which is measuring pulse data as described above.

In the above a radio system employing at least one dual protocol equipped radio device is described. The system and devices form a piconet in which message transaction parameters such as amount of data or requests to join the piconet, are monitored. A dual protocol device is then selected (or selects itself) according to the monitored parameters, and said selected device then switches the protocol it is using from a first protocol (such as Bluetooth), to a second protocol (such as ZigBee). Hence a flexible piconet is achieved in which various requirements concerning data connection and data-rates are accommodated.

Whilst the above embodiments describe a system utilising Bluetooth and ZigBee radio protocols, and embedded software code to perform the operation methods, those skilled in the art will recognise that other protocols such as IEEE802.11 or ultra wideband (UWB) may be used. Furthermore, the software or program code comprising the protocol monitoring code may be embodied in a physical carrier for inclusion in a device, or embodied in a signal for download to a host device at a later date. The physical carrier may include embedded non-volatile memory (such as that provided in the microcontroller mc8051 series) and other code carriers such as secure digital (SD cards™) which enable the code to be introduced and installed on the host device.

From reading the present disclosure, other modifications will be apparent to persons skilled in the art. Such modifications may involve other features which are already known in the design, manufacture and use of radio systems, devices and component parts thereof and which may be used instead of or in addition to features already described herein without departing from the spirit and scope of the present invention.

The invention claimed is:

1. A method for operating a wireless piconet in which devices are operable to communicate by exchanging messages according to a first and a second radio protocol, said first radio protocol being different from said second radio protocol, the method comprising:
   monitoring a payload portion of the messages according to said first protocol,
   monitoring a request to join the piconet in the payload portion transmitted from a further device,
   selecting a device for between the first and second protocols in dependence on said monitored payload portion, and
   switching, by the selected device, from said first protocol to said second protocol while maintaining communication via the first protocol with one or more devices other than the selected device to accommodate the request of said further device.

2. A method according to claim 1, wherein said monitored payload portion comprises the amount of data transmitted by each device in a specified time period to affect said selection.

3. A method according to claim 2, wherein said second protocol comprises a power saving mode utilised by a device when not participating in message transactions, and wherein a device is selected for switching to said second protocol based on said monitored amount of data being below a predefined threshold.

4. A method according to claim 1, wherein said selection of a device for switching is further based on device requirements stored in a device profile.

5. A method according to claim 1, wherein said piconet has a master-slave topology, and wherein said monitoring, and selection for switching steps are performed by a master device of said piconet.

6. A method according to claim 1, wherein the first protocol is Bluetooth and the second protocol is ZigBee.

7. A radio system in which devices are operable to communicate in a piconet by exchanging messages according to a first and a second radio protocol, said first radio protocol being different from said second radio protocol, the system comprising:
   means for monitoring a payload portion of messages according to said first protocol,
   means for monitoring a request to join the piconet in the payload portion transmitted from a further device,
   means for selecting a device for switching between the first and second protocols in dependence on said monitored payload portion, and
   means for switching, by the selected device, from said first protocol to said second protocol while maintaining communication via the first protocol with one or more devices other than the selected device to accommodate the first request of said further device.

8. A device for use in a radio system in which devices are operable to communicate in a piconet by exchanging messages according to a first and a second radio protocol, said first radio protocol being different from said second radio protocol, the device comprising:
   processing means for executing communication instructions according to said first and second radio protocol,
   a first and second baseband circuit and at least one radio for encoding and modulating the transmission and reception of messages in accordance with either of said first or second protocols,
   the device further comprising processing means operable to:
   monitor a load portion of the messages according to said first protocol,
   monitor a request to join the piconet in the payload portion transmitted from a further device,
   select a device for switching between the first and second protocols in dependence on said monitored payload portion, and
   switch the protocol used for communication by said selected device from said first protocol to said second protocol while maintaining communication via the first protocol with one or more devices other than the selected device to accommodate the request of said further device.

9. A device according to claim 8, wherein said device further comprises a switching circuit which, under control of said processing means, selects between said first and second baseband circuit to switch the protocol used for communication from said first protocol to said second protocol.

10. A device according to claim 8, wherein the modulation scheme for encoding messages for transmission according to said first protocol is different to the modulation scheme for encoding messages for transmission according to said second protocol.

11. A device according to claim 10, wherein said first modulation scheme of said first protocol is based on a frequency hopping technique, and said second modulation scheme of said second protocol is based on a direct sequence spread spectrum technique.

12. A non-transitory computer readable storage medium storing a protocol monitoring computer program comprising program instructions which, when executed by processing means of a radio device, cause said device to operate the method of claim 1.

13. A carrier comprising a non-transitory memory storage medium of a processing means storing a protocol monitoring computer program comprising program instructions which, when executed by the processing means, cause said processing means to execute the method of claim 1.

14. The carrier according to claim 13, wherein the non-transitory memory storage medium comprises a non-volatile memory area.

* * * * *